Oct. 12, 1948.  R. N. BENNETT  2,451,315
DIGGING WHEEL DRIVE FOR TRENCHERS
Filed June 23, 1945  2 Sheets-Sheet 1

INVENTOR.
Robert N. Bennett
BY
Malcolm W. Fraser
ATTORNEY

Oct. 12, 1948.　　　R. N. BENNETT　　　2,451,315
DIGGING WHEEL DRIVE FOR TRENCHERS
Filed June 23, 1945　　　　　　2 Sheets-Sheet 2
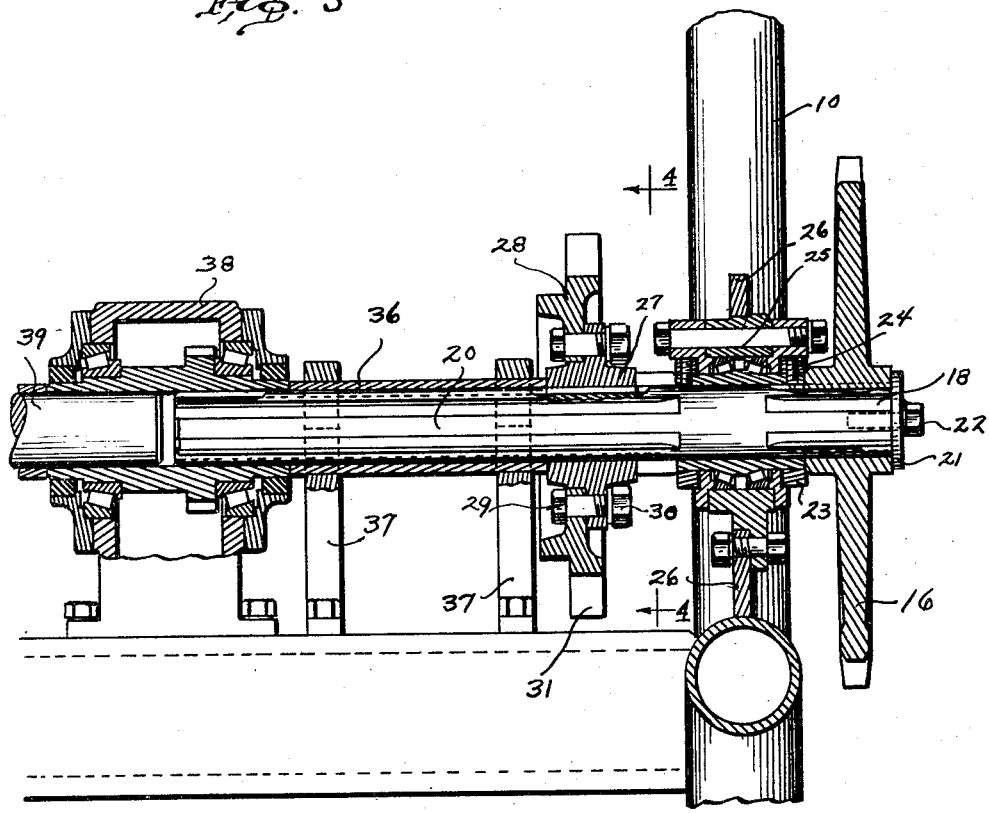
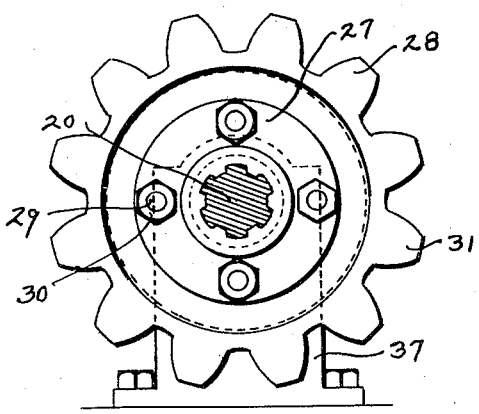
INVENTOR.
Robert N. Bennett
BY
　　　　ATTORNEY Patented Oct. 12, 1948

2,451,315

UNITED STATES PATENT OFFICE 2,451,315

DIGGING WHEEL DRIVE FOR TRENCHERS

Robert N. Bennett, Findlay, Ohio, assignor, by mesne assignments, to Gar Wood Industries, Inc., Detroit, Mich., a corporation of Michigan Application June 23, 1945, Serial No. 601,306

2 Claims. (Cl. 37—97)

This invention relates to a ditching machine, and more particularly to the means for driving the digging wheels.

Generally, in a machine of this type, the digging elements are carried by two wheel rims which are supported in spaced parallel relation for rotation about a relatively fixed axis. A series of cogs carried by the respective rims are enmeshed with the driving gears which, on rotation, impart the necessary movement. The driving gears are usually driven from a single shaft supported near its ends by suitable bearings. The entire load imposed by the digging elements is carried by the single driving shaft, the size of which must be varied upon the use of larger digging elements to counteract the increased stresses and the effect of the increased span between the supporting bearings. In an assembly of this type, the imposed forces impart a bending movement on the shaft which increases the shaft deflection as the forces are concentrated nearer the center of the shaft, and, thus, farther from the supporting bearings. In addition, any misalignment of the bearings caused by the frame deflection or poor assembly will result in preloading the shaft and bending stresses which may cause failure unconnected with that resulting from fatigue failure. The use of one single driving shaft compels equal movement of the driving gears and wheel rims. However, when one section of digging element encounters temporary resistance as a result of some embedded article in the ground, resistance to movement develops in that area of the digging element, thereby developing forces counteracting the equal movement of one wheel rim in relation to the other, resulting, not infrequently, in the failure of the main drive shaft or some other interconnecting element.

An object of this invention is the production of a digging wheel drive shaft comprised of more than one section such that any misalignment between the supporting bearings will not impose a bending stress upon the shafts, thereby causing premature failure.

Another object of this invention is the production of a split digging wheel drive shaft supported at its ends and at the split section by suitable bearings such that the imposed load of the digging elements is necessarily shared between the two sections of the split shaft.

A further object of this invention is the production and assembly of a split drive shaft supported at its ends and split center section by bearings such that the imposed stresses will not result in the excessive deflection of the shaft.

A still further object of this invention is the production and assembly of a split drive shaft such that the movement of one section in relation to the other will be permissible.

A still further object of this invention is to provide in a ditching machine of the above character, a split splined shaft affording easy assembly and positive connection of the attached elements.

Other objects of this invention reside in the details of construction, arrangement and operation as hereinafter described, and for purposes of illustration but not of limitation, an embodiment of the invention is shown in the accompanying drawings, in which:

Figure 3 is an enlarged fragmentary longitudinal sectional view substantially along the line 3—3 of Figure 2, showing the divided driving shaft for the digging wheel rims; and Figure 4 is a transverse sectional view on the line 4—4 of Figure 3.

Figure 1:
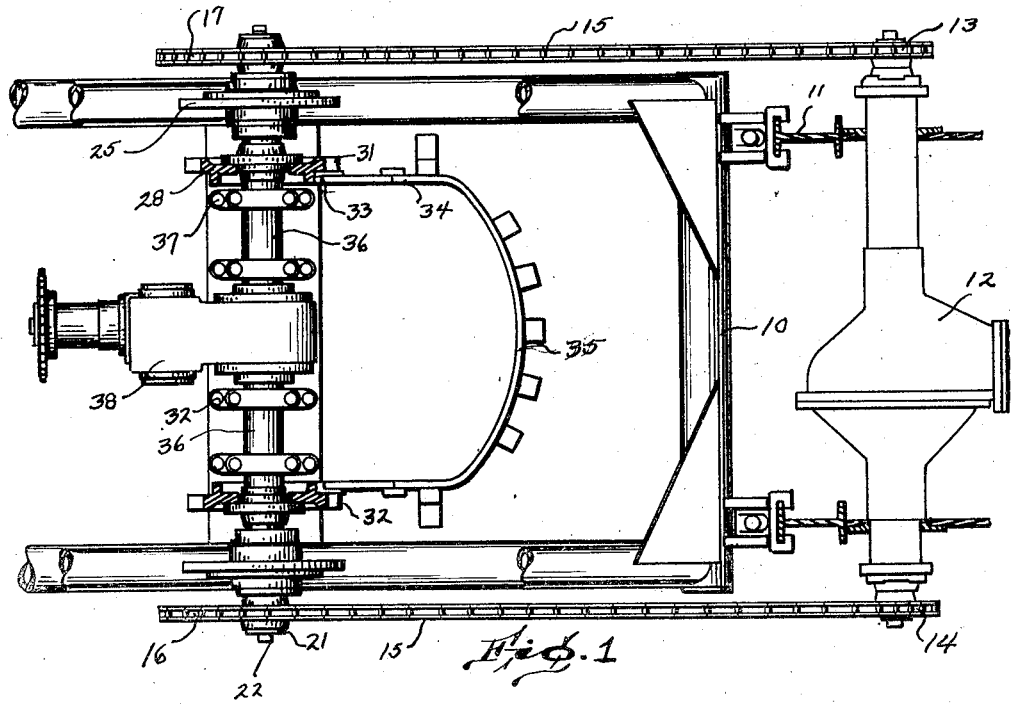
Figure 1 is a top plan view of the digging machine showing the elements in relation to the main drive shaft.

The illustrated embodiment of the invention comprises a digging wheel frame 10 which is vertically adjustable on rails 11 supported in an upright manner at the rear end of the traction machine, which also carries the differential transmission drive 12. Sprocket wheels 13 and 14 driven by the transmission drive 12 engage sprocket chains 15 which in turn drive sprocket wheels 16 and 17 on the digging wheel frame. It is to be understood that the differential drive 12 permits rotational movement of the sprocket wheel 13 in relation to the sprocket wheel 14, and similarly, the sprocket wheel 16 in relation to the sprocket wheel 17.

Figure 2:
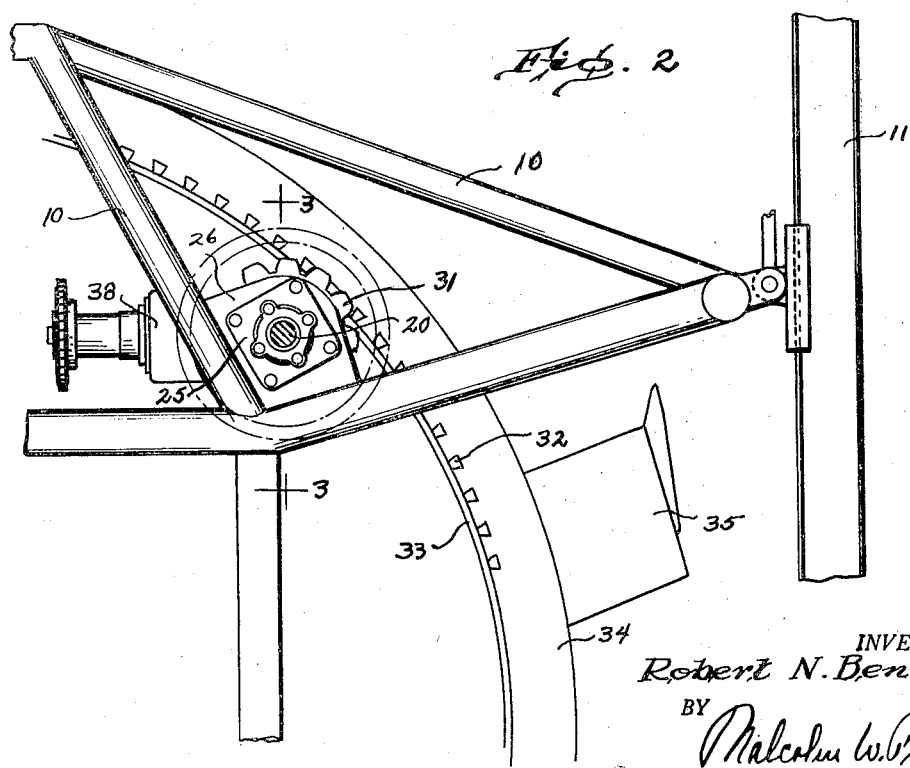
Figure 2 is a vertical sectional view showing the means for supporting one end of the driving shaft in the carrying frame.

Spaced keys of sprocket wheel 16 seat into grooves 18 of a splined shaft 20 and impart rotational movement thereto. The sprocket wheel 16 is retained on the end portion of the shaft 20 by a disc 21 secured by a cap screw 22. A bearing sleeve 23 is secured by set screws 24, which seat into the unsplined portion of the shaft 20. An anti-friction bearing assembly 25 in cooperation with the sleeve 23 is secured to a bracket plate 26 which attaches to the angular supports of the digging wheel frame 10 as shown in Figure 2.

Keyed to and disposed inwardly along the splined shaft 20 is a hub 27 to which a driving gear 28 is secured by means of bolts 29 and nuts 30. The teeth 31 of the driving gear mesh with cogs 32 carried by the digging wheel rim 33. Secured to each digging wheel rim 33 are arcuate segments 34 and bridging the rims 33 are digging buckets 35. Each digging wheel rim revolves on idler rolls, not shown, which are attached to the digging wheel frame.

A bearing sleeve 36 which also serves as a spacer to prevent the lateral movement of the driving wheel assembly along the shaft 20 is mounted on bracket members 37 which are bolted to the digging wheel frame 10.

The splined end portion of the driving wheel shaft 20 is disposed in the conveyor reverse transmission assembly 38 which is driven through keyway engagement with the splined shaft 20. The conveyor reverse transmission 38 is securely anchored to the digging wheel frame and serves as a bearing support for the end of the split splined shaft 20. The conveyor reverse transmission drives a laterally moving belt which deposits the excavated dirt at the side of the machine, and since it does not constitute a part of this invention, detailed description is not considered necessary.

The other half of the split main shaft is substantially similar to the element described above except that the inner end portion of the other shaft 39 is not positively connected to the sleeve in the conveyor reverse transmission 38, but is free to rotate therein, such that the shaft 39 may turn in relation to the aligned shaft 20. Positive rotation of the shaft section 39 is imparted by the other attached sprocket wheel 17.

From the above description, it will be manifest that by means of a split main drive shaft, I have devised a simple and efficient means of imparting the desired rotational movement to the digging wheels, and overcoming the disadvantages inherent in the customary one-piece drive shaft. Though splined sections have been used in the description for affording positive connections, it is to be understood that other suitable means may be used for attaching the elements to the drive shaft.

While I have shown and described the invention as applied to one specific type of digging machine, it is to be understood that the invention is not limited to that specific machine but may be modified for use with various other types of machines. It is also to be understood that changes in details of construction, arrangement and operation may be effected without departing from the spirit of the invention, especially as defined in the appended claims.

What I claim is:

1. In a ditching machine, a frame, a digging wheel mounted thereon having oppositely disposed rims secured to the side edges thereof, two axially aligned shafts having their inner ends spaced slightly from each other, a gear fixed to the outer end portion of each shaft, differential means for driving said gears, a bearing on the frame for the outer end portion of each shaft, gearing connecting the shafts individually to the respective rims, a conveyor transmission including a gear having an elongate tubular portion receiving the adjacent ends of said shafts, and a driving connection between one shaft and said tubular portion, the other shaft being rotatable relatively to said tubular portion.

2. In a ditching machine, a frame, a digging wheel mounted thereon having oppositely disposed rims secured to the side edges thereof, two axially aligned shafts having their inner ends spaced slightly from each other, a gear fixed to the outer end portion of each shaft, differential means for driving said gears, a bearing on the frame for the outer end portion of each shaft, gearing connecting the shafts individually to the respective rims, a conveyor transmission including a gear having an elongate tubular portion receiving the adjacent ends of said shaft, a driving connection between one shaft and said tubular portion, the other shaft being rotatable relatively to said tubular portion, and bracket means on said frame enclosing said gear and providing a support for same.

ROBERT N. BENNETT.

REFERENCES CITED

The following references are of record in the file of this patent:

UNITED STATES PATENTS

| Number | Name | Date |
|---|---|---|
| 1,714,306 | George | May 21, 1929 |
| 1,852,048 | George | Apr. 5, 1932 |